United States Patent
Lester et al.

(10) Patent No.: US 10,162,847 B2
(45) Date of Patent: *Dec. 25, 2018

(54) SMART ADDRESS BOOK

(71) Applicant: COMCAST INTERACTIVE MEDIA, LLC, Philadelphia, PA (US)

(72) Inventors: Peter Lester, Oakland, CA (US); Justin Miller, Los Gatos, CA (US); Hendrick Lee, Sunnyvale, CA (US); Aseem Sharma, Fremont, CA (US); Galen Trevor Gattis, Sunnyvale, CA (US); Amber Dixon, Santa Clara, CA (US); Huy Tuan Nguyen, San Jose, CA (US); Derek McGowan, Santa Clara, CA (US); John McCrea, Palo Alto, CA (US)

(73) Assignee: Comcast Interactive Media, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/304,285

(22) Filed: Jun. 13, 2014

(65) Prior Publication Data
US 2014/0365509 A1    Dec. 11, 2014

Related U.S. Application Data

(63) Continuation of application No. 12/942,787, filed on Nov. 9, 2010, now Pat. No. 8,782,149.

(51) Int. Cl.
*G06F 17/30* (2006.01)
*G06Q 10/10* (2012.01)

(52) U.S. Cl.
CPC ..... *G06F 17/30371* (2013.01); *G06Q 10/109* (2013.01); *G06F 17/30283* (2013.01)

(58) Field of Classification Search
CPC . G06F 17/30–17/30371; G06Q 10/10–10/109; H04L 67/00–67/42; H04L 12/58–12/585
See application file for complete search history.

(56) References Cited

U.S. PATENT DOCUMENTS 6,829,607 B1 * 12/2004 Tafoya et al.
6,857,072 B1 *  2/2005 Schuster et al. .............. 713/160
(Continued)

FOREIGN PATENT DOCUMENTS

WO    2005/031524 A2    4/2005
WO    2008/064483 A1    6/2008

OTHER PUBLICATIONS

European Search Report, EP 11 18 8213, completion date Feb. 21, 2012.
(Continued)

*Primary Examiner* — Clayton R Williams
(74) *Attorney, Agent, or Firm* — Banner & Witcoff, Ltd.

(57) ABSTRACT

An apparatus, method, system, and computer-readable medium are provided for maintaining contact information associated with a contact. In some embodiments a request associated with a contact may be received. Contact information may be obtained from one or more external or internal sources. One or more confidence scores may be generated for the obtained contact information and for one or more values received with the request. Based on the confidence score(s), one or more values associated with the contact may be incorporated in one or more data stores. In some embodiments, suggestions for contact related information may be generated. Responses to the suggestions may be used to update the generated confidence score(s).

22 Claims, 10 Drawing Sheets

(56) References Cited

U.S. PATENT DOCUMENTS

| | | |
|---|---|---|
| 8,230,019 B2 | 7/2012 | Keohane et al. |
| 2002/0099561 A1 | 7/2002 | Wilkins et al. |
| 2004/0179672 A1 | 9/2004 | Pagel et al. |
| 2004/0220907 A1 | 11/2004 | Camarillo |
| 2006/0236089 A1 | 10/2006 | Cohen |
| 2007/0156766 A1* | 7/2007 | Hoang ............... G06F 17/30014 |
| 2007/0294281 A1 | 12/2007 | Ward et al. |
| 2008/0147635 A1 | 6/2008 | Im |
| 2008/0244008 A1 | 10/2008 | Wilkinson et al. |
| 2009/0125382 A1* | 5/2009 | Delepet ............................ 705/10 |
| 2009/0157732 A1 | 6/2009 | Hao et al. |
| 2009/0307206 A1 | 12/2009 | Morrison et al. |
| 2009/0319288 A1 | 12/2009 | Slaney et al. |
| 2010/0100377 A1 | 4/2010 | Madhavapeddi et al. |
| 2010/0131489 A1 | 5/2010 | Goldman-Shenhar et al. |
| 2010/0191844 A1* | 7/2010 | He ........................... H04L 67/22 709/224 |
| 2010/0203874 A1 | 8/2010 | Scott et al. |
| 2010/0245532 A1 | 9/2010 | Kurtz et al. |
| 2010/0275128 A1 | 10/2010 | Ward et al. |
| 2010/0299340 A1* | 11/2010 | Murthy et al. ................. 707/759 |
| 2011/0047213 A1* | 2/2011 | Manuel .................. G06Q 30/00 709/204 |
| 2011/0055172 A1 | 3/2011 | Tan et al. |
| 2011/0067101 A1* | 3/2011 | Seshadri ............... G06F 21/552 726/22 |
| 2011/0085654 A1 | 4/2011 | Jana et al. |
| 2011/0087427 A1* | 4/2011 | Liu ........................ G01C 21/20 701/532 |
| 2011/0125770 A1 | 5/2011 | Battestini et al. |
| 2011/0153564 A1* | 6/2011 | Cochinwala et al. ......... 707/624 |
| 2011/0179149 A1 | 7/2011 | Kazan et al. |
| 2011/0307455 A1 | 12/2011 | Gupta et al. |
| 2012/0016875 A1* | 1/2012 | Jin et al. ........................ 707/734 |
| 2012/0129572 A1 | 5/2012 | Johnstone et al. |
| 2013/0041899 A1* | 2/2013 | Simske et al. ................. 707/736 |

OTHER PUBLICATIONS

European Office Action—EP Application 11188213.0—dated Jun. 25, 2015.

Response to European Office Action—EP Appl. 11188213.0—submitted Dec. 22, 2015.

Anonymous: "Cable modem termination system—Wikipedia, the free encyclopedia"—published Oct. 16, 2010—XP055279201—initially retrieved from the Internet URL: https://en.wikipedia.org/w/index.php?title=Cable_modem_termination_system&oldid=391029470.

Anonymous: "Gateway (telecommunications)—Wikipedia, the free encyclopedia"—published Oct. 23, 2010—XP055279202—Retrieved from the Internet: URL: https://en.wikipedia.org/w/index.php?title=Gateway_(telecommunications)&oldid=392315009.

European Summons to Oral Proceedings—EP Appl. 11188213.0—dated Jul. 4, 2016.

European Decision to Refuse—EP App No. 11188213.0—dated Feb. 22, 2017.

Sep. 28, 2017—Canadian Office Action—CA 2,757,566.

* cited by examiner

| Field | Value | Confidence Score | Source |
|---|---|---|---|
| Name | Maria Rodriguez<br>Mary Rodriguez<br>Maria K. Rodriguez | 0.65<br>0.64<br>0.78 | Address Book 304<br>Address Book 304'<br>White Pages |
| Email Address | maria1239781@serviceprovider.com<br>marykrod@serviceprovider.com | 0.72<br>0.45 | Address Book 304<br>Service Provider Database |
| Instant Messenger Handle | maria123978<br>maria1239781<br>mariakrodriguez | 0.04<br>0.85<br>0.21 | Address Book 304<br>Service Provider Database<br>Service Provider1 Database |
| Phone Number (Home) | 999-999-9999<br>724-724-7247<br>628-628-6286 | 0.45<br>0.66<br>0.87 | Address Book 304<br>White Pages<br>White Pages1 |
| Phone Number (Work) | 999-999-9998<br>628-629-6296 | 0.46<br>0.91 | Address Book 304<br>Social Networking Page |

| Field | Value | Confidence Score | Source |
|---|---|---|---|
| Name | Maria K. Rodriguez | 0.78 | White Pages |
| Email Address | maria1239781@serviceprovider.com | 0.72 | Address Book 304 |
| Instant Messenger Handle | maria1239781 | 0.85 | Service Provider Database |
| Phone Number (Home) | 628-628-6286 | 0.87 | White Pages1 |
| Phone Number (Work) | 628-629-6296 | 0.91 | Social Networking Page |

368

Fig. 3C entry #1

| Field | Value |
|---|---|
| Name | Jane Smith |
| Email Address | jane@serviceprovider1.com |
| Phone Number (Home) | 111-111-1111 | entry #2

| Field | Value |
|---|---|
| Name | Jane Wilson |
| Email Address | jane@serviceprovider2.com |
| Phone Number (Mobile) | 888-888-8888 |
| Instant Messenger Handle | janewilson |

Fig. 8

SMART ADDRESS BOOK

CROSS REFERENCE TO RELATED APPLICATIONS

This application is a continuation of and claims priority to U.S. patent application Ser. No. 12/942,787, filed on Nov. 9, 2010 and entitled "Smart Address Book," which is hereby incorporated by reference in its entirety herein.

BACKGROUND

The use of computers and networks has changed the way people go about their day to day lives. For example, people used to maintain contact information associated with individuals (e.g., friends, relatives, etc.) in a paper address book. When contact information associated with a particular individual or entry changed, the owner of the address book typically crossed out or erased (e.g., whited-out) the old information and wrote-in the new information. In recent years, many people have turned to electronic and/or online services for maintaining address books. An electronic and/or online address book has many benefits, such as the added benefit of easy accessibility relative to a paper address book. For example, a user might access his/her online address book via a mobile device (e.g., personal digital assistant (PDA)).

Address books, irrespective of form, often contain inaccurate, duplicative, out-of-date, or incomplete data. When contact information (e.g., an email address) is used by a user to send a message (such as by email) to a contact, and that message is returned to the user as undeliverable, conventional techniques do not provide accurate, up to date contact information by which the user can send another message to the contact. When a user adds contact information to an address book, conventional solutions simply add the contact information to a data store—potentially allowing inaccurate, out-of-date, or incomplete data to exist or be added. Even if the contact information is entered correctly, the contact information may be a substantial duplicate of contact information already present in the data store. When it is determined that a conflict in contact information exists, conventional solutions fail to provide techniques for resolving the conflict. Applicants have recognized these and other shortcomings, and therefore an improved system and method are needed to update, maintain, and manage address books, contact listings, and related information and data.

SUMMARY

This summary is not intended to identify critical or essential features of the disclosure provided herein, but instead merely summarizes certain features and variations thereof.

In some illustrative embodiments, contact information associated with a request may be received. The contact information associated with the request may be compared against contact information acquired from other sources. Confidence scores may be generated or assigned to one or more fields of the contact information and suggestions or actions based on the suggestions may be presented to a user and/or automatically implemented.

In some illustrative embodiments, a user's responses to suggestions or actions based on the suggestions in connection with contact information may serve as feedback to the entities and algorithms that generate the suggestions and actions based on the suggestions. In this manner, an adaptive suggestion algorithm may be obtained, with the accuracy of the provided suggestions potentially improving over time and with use.

In some illustrative embodiments, heuristics may be used to improve or enhance the accuracy associated with suggestions. For example, confidence scores associated with contact information collected from one or more sources and suggestions may be used to reduce or eliminate potential suggestions from a candidate set of suggestions. Contact information may be analyzed in terms of both historical values and current values to assess a likelihood or probability that a particular piece of contact information is accurate or current relative to a counterpart piece of contact information obtained from another source.

Other details and features will also be described in the sections that follow.

BRIEF DESCRIPTION OF THE DRAWINGS

Features of the disclosure will become more apparent upon a review of this disclosure in its entirety, including the drawing figures provided herewith.

Some features herein are illustrated by way of example, and not by way of limitation, in the figures of the accompanying drawings and in which like reference numerals refer to similar elements.

FIG. 3B illustrates an example collection of source contact information in accordance with one or more aspects of this disclosure.

FIG. 3C illustrates a composite view of contact information in accordance with one or more aspects of this disclosure.

FIG. 8 illustrates address book entries in accordance with one or more aspects of this disclosure.

DETAILED DESCRIPTION

Various connections between elements are discussed in the following description. These connections are general and, unless specified otherwise, may be direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
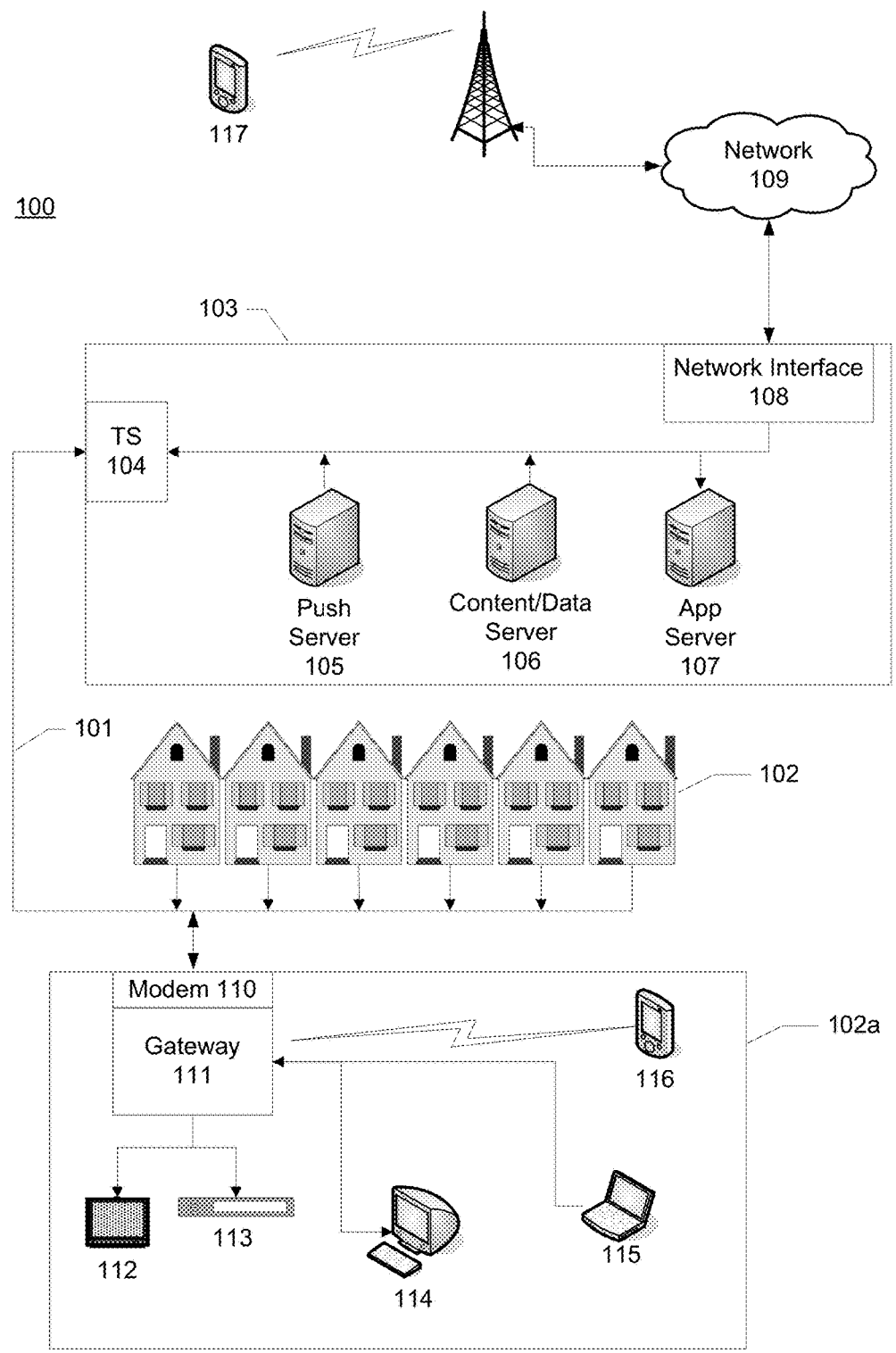
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, etc. One example may be a wireless network, an optical fiber network, a coaxial cable network or a hybrid fiber/coax (HFC) distribution network. Such networks 100 use a series of interconnected communication lines 101 (e.g., coaxial cables, optical fibers, wireless links, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a cable modem termination system (CMTS) in an HFC-type network, which may be a computing device configured to manage communications between devices on the network of lines 101 and backend devices such as servers 105-107 (to be discussed further below). The termination system (TS) may be as specified in a standard, such as the Data Over Cable Service Interface Specification (DOCSIS) standard, published by Cable Television Laboratories, Inc. (a.k.a. CableLabs), or it may be a similar or modified device instead. The termination system (TS) may be configured to place data on one or more downstream frequencies to be received by modems or other user devices at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content and/or data server 106. The content/data server 106 may be one or more computing devices that are configured to provide content to users in the homes. This content may be, for example, video on demand movies, television programs, songs, text listings, etc., and/or data such as contact information, address books, and other user information. The content/data server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide or interactive program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for receiving user remote control commands, and processing them to provide an intelligent remote control experience.

An example premises, e.g., home 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired device offering similar functionality. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may comprise a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
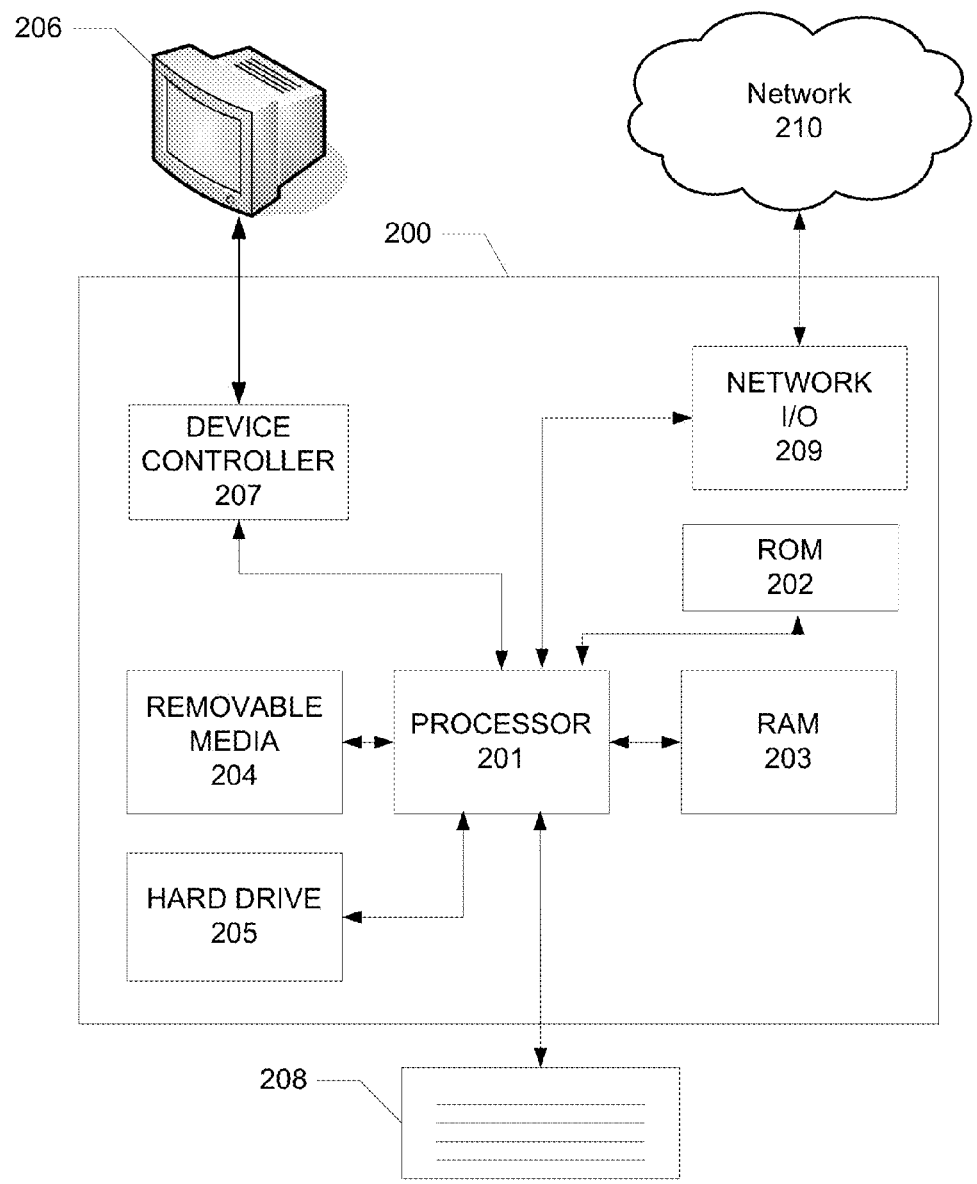
FIG. 2 illustrates an example hardware platform on which various elements described herein can be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

By way of introduction, some aspects of this disclosure may provide for improved communications and management between a user or owner of an address book and one or more contacts referenced by, or included in, the address book. The improved communication may be brought about at least as a partial result of an improvement in the accuracy of the address book, which may contain one or more entries. Each entry may be associated with one or more contacts. In some embodiments, the address book may be registered with or maintained by one or more service providers.

Figure 3A:
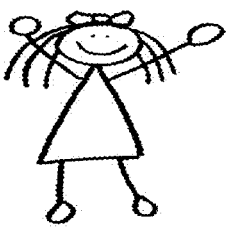
FIG. 3A illustrates an example data store entry in accordance with one or more aspects of this disclosure.

An example entry 304 in an address book associated with a contact by the name of Maria Rodriguez is shown in FIG. 3A. Specifically, in FIG. 3A, entry 304 may include various fields for contact information including, for example, name, nickname, email address, instant message handle/sign-in name, home phone number, work phone number, cell phone number, and mailing address. The fields shown in FIG. 3A are illustrative. In some embodiments, some of the fields shown might not be included. In some embodiments, additional fields not shown may be included.

The fields shown in connection with entry 304 may be populated in any number of ways. For example, the contact information associated with the various fields may have been populated in response to a user manually entering the data. Some or all of the fields may have been populated in response to a message having been sent or received. For example, if a user sends an email to "maria1239781@serviceprovider.com" then the email field of entry 304 may have been automatically populated and the user may be prompted to populate one or more of the remaining fields.

In order to improve the completeness, accuracy, etc., of an address book, one or more devices such as computers may obtain contact information from multiple sources in order to obtain an aggregate view of an individual, corporation, partnership, etc., associated with an entry. In terms of determining whether contact information obtained from multiple sources likely refers to the same contact, one or more contact fields (e.g., phone number, email address, social security number, instant messenger handle, etc.) may be examined or analyzed.

Continuing the above example, if in a user's address book "Maria Rodriguez" is listed as a contact, one or more systems (e.g., computers, servers) may pull contact information associated with Maria Rodriguez from one or more sources such as databases or any other storage locations (e.g., personal computers, smart mobile devices, etc.). In some embodiments, Cassandra databases as developed by the Apache Software Foundation may be used to implement the one or more databases, for example. Without limitation, the databases may relate to other address book entries from users of a system or service, message (e.g., email, text message, instant message, phone call, etc.) deliverability logs, phone books (e.g., yellow/white pages), social networking sites, web sites/pages, data licensing providers, and the like. Databases or sources external to a network operator or service provider may be referred to as external sources. Examples of external sources may include phone books, web sites/pages, and the like. Sources internal to the network operator or service provider may be referred to as internal sources. Examples of internal sources may include address books registered with a service provider, web sites/pages (e.g., user pages associated with a social networking service), and the like.

Figure 4:
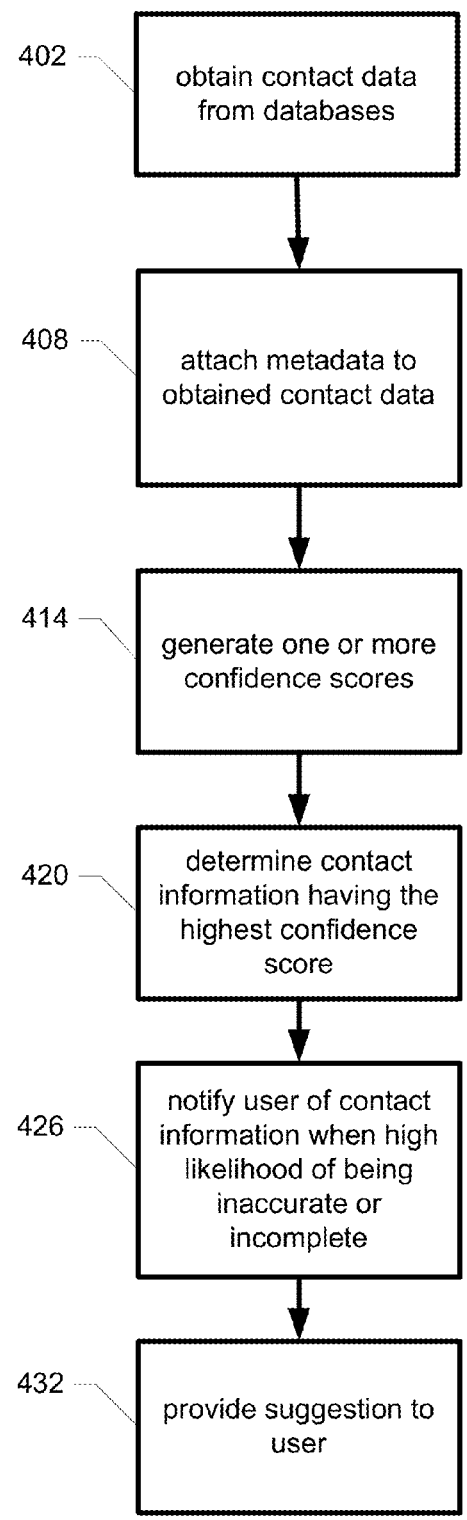
FIG. 4 illustrates a method for assigning confidence scores and generating suggestions in relation to contact information in accordance with one or more aspects of this disclosure.

Referring to FIGS. 3A, 3B, 3C, and 4, step 402 of the method shown in FIG. 4 reflects the acquisition of contact related data from the multiple databases (or other sources). Step 402 may occur, for example, when a user or system initiates an update request, when a user prepares or sends a message, or for other reasons. The acquisition of step 402 may be based on one or more indexing schemes and one or more fields or values of contact information. For example, if a user enters the name "Maria Rodriguez" in the "to" field of a message (e.g., an email, a text message, etc.) to be sent, a user or service provider device or application may scan one or more internal or external sources for contact information associated with the name "Maria Rodriguez." In some embodiments, combinations of contact information may serve to provide a baseline or trigger for determining whether it is likely or probable that contact information refers to a particular contact.

Briefly referring to FIG. 3B, a source view of a collection of contact information 356 referring to Maria Rodriguez is shown. The source view 356 may represent a result of step 402 of FIG. 4. The source view 356 may include a name field, an email address field, an instant messenger handle field, a home phone number field, and a work phone number field, for example.

One or more data fields or values for each field of source view 356 may be obtained from one or more sources and a confidence score may be assigned or generated for one or more of the data fields or values. As shown in FIG. 3B, values "Maria Rodriguez", "Mary Rodriguez", and "Maria K. Rodriguez" may be obtained from an address book having entry 304 (of FIG. 3A), another address book 304' (not shown), the White Pages, or other sources, for example. Confidence scores of "0.65", "0.64", and "0.78" (shown, for example, on a scale or range from 0 to 1, with a resolution to the order of one one-hundredth) may be associated with the values for the name field as sourced, for example, from address book 304, address book 304', and the White Pages, respectively, as shown in FIG. 3B. With respect to the other fields (email address, instant messenger handle, home phone number, and work phone number) shown in connection with source view 356, confidence scores may be associated with the values and sources as shown in FIG. 3B. The generation of confidence scores is described further below. Although in this example the confidence score is a numerical value between 0 and 1, the confidence score may be expressed in any numerical range or other suitable manner.

The source view 356 shown in FIG. 3B is illustrative. In some embodiments, different ranges of confidence scores may be used and different resolutions for the confidence scores may be used. In some embodiments some of the fields shown in connection with FIG. 3B may be optional and fields not shown may be included. For example, and without limitation, one or more of job title, place of employment, organizational affiliation(s), marital status/spouse's name, child/children's name(s), may be used in some embodiments. Also, source view 356 may or may not be generated for display.

Referring back to FIG. 4, in step 408, the one or more computers or other devices may attach or acquire metadata to be associated (e.g., with each value or field) with obtained contact information. The metadata may identify the source of the contact information (e.g., the sources of FIG. 3B), a date or timestamp associated with the contact information, a change history or trajectory associated with the contact information, whether or not the contact information is from a public or private source, etc. Examples of public sources may include telephone directories (such as the white pages or the yellow pages), sources where users voluntarily publish their information for public use (e.g., in connection with volunteering in a service organization), etc. Examples of private sources may include banking account information, hospital or medical records, etc.

In some embodiments, metadata that indicates whether the contact information is from a public or private source may influence or dictate how that piece of contact information may be used. For example, one privacy setting may allow the obtained contact information to be used to indicate to a user that the contact information in the user's address book is inaccurate or incomplete without providing the corrected contact information to a user. A more liberal privacy setting may allow the obtained contact information to be presented to a user as a suggestion for correction as described further below. Any number of privacy settings may be associated with the obtained contact information or pieces thereof.

In step 414, for one or more pieces of contact information a confidence score may be generated. The confidence score may indicate how likely it is that the contact information is correct/accurate or incorrect/inaccurate. Any number of criteria may be applied in assigning the confidence score. For example, the metadata that was attached in connection with step 408 may be examined or analyzed in generating the confidence score in connection with step 414. For example, if the metadata indicates that the source of the contact information is relatively trustworthy and/or that the contact information has a relatively recent associated date or timestamp, and/or there is an indication of a recent successful use of the contact information, then a high confidence score may be generated. A high confidence score may indicate that it is likely that the contact information is correct or accurate. Conversely, a low confidence score may indicate that it is likely that the contact information, or a particular portion thereof, is incorrect or inaccurate. In some embodiments, a low confidence score may be assigned based on origination of the information, for example, when an address book internal to a given service provider's system served as the origin or starting point for the contact information. The various criteria may be weighted relative to each other in any combination in order to generate the confidence score. The range in the confidence scores may be customized or tailored in various embodiments in order to provide a desired degree of resolution. In some embodiments the various factors or criteria may be assigned initial values based on intuition and the initial values may be updated over time or through use as described further below. For example, in some embodiments a contact's social security number might be weighted heavily given that a social security number may refer to a single individual. Conversely, if a name is entered, that entered name may initially receive a low value or score, particularly if there are number of contacts in the system with the same or a similar name that exceeds a threshold.

Suggested contact information may be generated based on obtained contact data (e.g., step 402 of FIG. 4). Suggested contact information may be based at least in part on third party data and contact information appearing in other users' address books, thereby leveraging off of the so-called wisdom of the crowds. In other words, all other things being equal, contact information that appears in a large number of address books and/or is subject to public scrutiny may be more likely to be accurate relative to contact information that only appears in a minimal number of address books or only appears in private collections. In some embodiments, the use of wisdom of the crowds data (optionally based on address book data) may serve as a foundation, and data derived from one or more (external) sources may be layered on top of that foundation to determine which pieces of contact information are most likely to be correct (as described further below).

In step 420, a determination may be made regarding the contact information that has the highest confidence score. Continuing the above example, for contact Maria Rodriguez, it may be determined that the confidence scores indicate that Maria's likely instant message handle is maria1239781 (as opposed to maria123978 as shown in entry 304 of FIG. 3A). The value of maria123978 in the instant message handle field of entry 304 may have been the result of a typographical error, for example.

In step 426, a user may be notified of potential issues/errors/discrepancies associated with contact information. Continuing the above example, when it is determined in step 420 that the instant messenger handle for Maria Rodriguez was likely incorrect in entry 304 of FIG. 3A based at least in part on the confidence scores generated in connection with step 414, the user associated with the address book may be notified. The notification may take any form, such as a pop-up window on a display screen, a text message, a beeping sound, a voice message (such as an automated voice message), the data information blinking or taking on a different display form (e.g., different font, italics, bold and the like), etc. In some embodiments, the notification may be of a general nature, such as text providing that "one or more fields associated with this entry may be incomplete or inaccurate." In some embodiments, the notification may be more specific, such as text providing that "the instant message handle field associated with this entry may be incomplete or inaccurate." Any level of specificity may be used in providing the notification. In some embodiments, a user may allow for incorrect information to be automatically removed.

In step 432, one or more suggestions for updating or correcting contact information may be presented to a user. The suggestions associated with step 432 may be presented with the notification of step 426 in some embodiments. Continuing the above example of the instant message handle for Maria Rodriguez having been populated incorrectly, a suggestion such as "the instant message handle should be changed to maria1239781" may be presented to the user. In some embodiments, whether the suggestion is provided to the user may be based at least in part on whether the confidence score associated with the suggested contact information exceeds a threshold, whether the suggested contact information is enabled for such use in terms of privacy considerations, and any other such considerations. For example, in one embodiment, if the different contact information is only identified in a single external source, it may not be provided as suggested contact information whereas if the contact information is from an internal source or more than one external source, it may be provided as suggested contact information. In some embodiments, based on user preference, suggested contact information may be used to automatically update an address book.

Briefly referring to FIG. 3C, a composite view of a collection of contact information 368 referring to Maria Rodriguez is shown. Composite view 368 may be generated (and displayed or not displayed, depending upon an implementation) in response to steps 420-432 of FIG. 4. Relative to source view 356 of FIG. 3B, composite view 368 of FIG. 3C is shown as having retained the values corresponding to the highest score for each of the fields. In some embodiments, one or both of the confidence scores and source identifiers might not be saved in connection with the composite view.

In some embodiments, more advanced or different logic may be used to generate composite view 368. For example, confidence scores from source view 356 may be averaged with respect to each source, and the source having the highest confidence score may be used to provide the values for composite view 368, at least where the source provided a value for that field.

In some embodiments, the contact information associated with one or both of source view 356 and composite view 368 may be stored in a central or common data store or displayed on a provider's or user's display device.

Referring to FIGS. 3B, 3C, and FIG. 4, in some embodiments, the user may be asked to confirm whether the suggested contact information associated with step 432 and composite view 368 should be populated into an address book entry (e.g., entry 304). The confirmation may require an affirmative or explicit action on the part of the user, such as the depression of a button or key on a device, speaking into a microphone associated with the device the word "yes" to accept the suggested contact information or "no" to reject the suggest contact information, choosing a selection from a drop-down menu, or the like. The confirmation may also take place on a passive basis, such as after the expiration of a predetermined time-out.

In some embodiments, an update to an entry of an address book with suggested contact information (e.g., the suggested contact information associated with step 432) may take place automatically. Such an automatic update may be desirable in embodiments where a user does not want to receive a notification that the contact information is likely inaccurate. In some embodiments, for an automatic update to take place the confidence score associated with the suggestion may need to be extremely high (such as a 0.98 out of a possible 1.00), or that is to say, above a threshold value or in a particular range. Suggested contact information having a confidence score below that threshold may result in the user being requested to confirm whether to accept the suggestion in some examples.

The method shown in FIG. 4 may be conducted for each address book entry in a given system. The method may be executed periodically (e.g., once every week). Alternatively, or additionally, the method may be executed in response to one or more events (e.g., a user communication with a contact (e.g., sending an email to a contact) included in the user's address book, when new data is obtained (in connection with step 402), when a message is returned as "undeliverable," etc.). How frequently the method is run or executed may be based on any number of considerations, such as system complexity and processing resources for example. The method shown in FIG. 4 may be used to enhance the accuracy or completeness of a user's address book, while still allowing the user the ability to customize various fields associated with any given entry.

As described above, an address book entry may include one or more fields, such as an email address field. It may be beneficial to a user to flag or otherwise indicate which email address(es) included in an address book entry are still working/functional. An email address field may be considered to be working or functional when an email sent to that address is received by a computing device associated with the recipient. When an email address is not working or is not functional, a status message may be received at a computing device associated with the sender advising the sender that the email was undeliverable. A user may also set the flag for an address book entry that they know to be inaccurate. In such a case, the system may then seek the wisdom of the crowd and initiate a request for suggested contact information.

Figure 5:
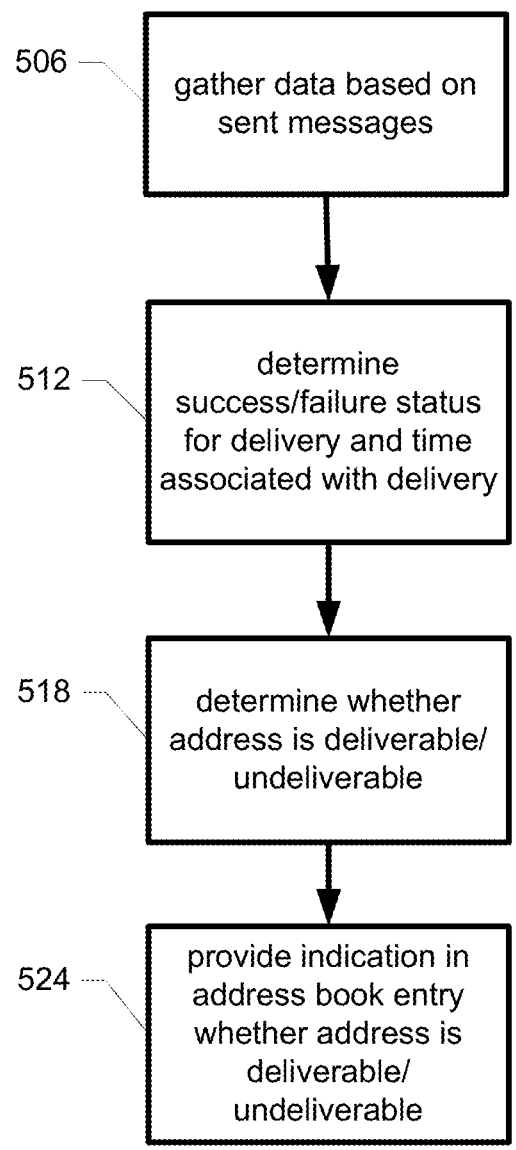
FIG. 5 illustrates a method for determining a deliverability status associated with an address in accordance with one or more aspects of this disclosure.

FIG. 5 illustrates a method that may be used to flag or otherwise indicate which fields of contact information (e.g., email address(es)) included in an address book entry are still working/functional. In step 506, data may be gathered based on sent emails. The gathered data may be based on emails sent, for example, by a service hosting user address books (e.g., an email or service provider). The gathered data may be based on emails sent from users via email clients/applications (e.g., Microsoft Outlook). In some embodiments, the data may be gathered at a server or at a central location (e.g., central location 103 of FIG. 1).

In step 512, for each unique email address a determination may be made as to when an email was sent to that address and whether or not the email was successfully delivered. In some embodiments, successful or unsuccessful delivery may be a function of time or number of attempts. For example, if the sending of an email to a particular address fails every day for a given week, then the email address may be flagged or otherwise indicated as being undeliverable. Similarly, if three out of five attempts to send an email to the particular address fail, the address may be flagged or otherwise indicated as being undeliverable. If the email was not successfully delivered, the reason why it was not delivered (e.g., unknown user, bad domain, address error, closed account, etc.) may also be recorded. The recording of status with respect to delivery may take place at one or more devices, such as on a server at a central location (e.g., central location 103 of FIG. 1). In some embodiments, the recorded status may help a user or a service provider determine why delivery of an email was unsuccessful in the event of a failure. In some embodiments, the status may indicate whether an email sent by a service provider or email application (e.g., Microsoft Outlook) was deliverable or undeliverable.

In some embodiments, an email might not be delivered for transient reasons, such as an account or inbox being full. In some embodiments, such failures may be referred to as "soft bounces." Soft bounces might not result in an email address being declared undeliverable in some embodiments, for example in connection with step 512.

In step 518, and based on the determinations made in connection with step 512, a determination may be made for each unique email address whether the address is deliverable/working/functional or undeliverable/not working/not functional. Also in step 518, it may be determined when (e.g., by date and/or timestamp) an email was last successfully/unsuccessfully delivered to the email address or the email domain associated with the address. In some embodiments, the determination of step 518 may be made at one or more devices, such as a server at a central location (e.g., central location 103 of FIG. 1).

In step 524, an indication may be provided in an address book entry of email address(es) (or other addresses) that are deliverable/functional/working. For example, the indication may appear as a (green) checkmark appearing next to the email address(es). Similarly, an indication may be provided in an address book entry for email address(es) that are undeliverable/not functional/not working. Such a negative indication may take the form of a (red) 'X' appearing next to the non-operational email address(es), for example. Other forms for the notification of step 524 may be used in some embodiments. For example, if a user browses her address book on a user equipment device and selects an address book entry or an email address, different sounds may be generated by the user equipment device depending on whether the email address is determined to be deliverable or undeliverable. The indication of step 524 may be provided by one or more computing devices, such as a server located at a central location (e.g., central location 103 of FIG. 1), to a user equipment device (e.g., a mobile device).

If an email address is determined to be undeliverable, the reason why (e.g., unknown user, bad domain, address error, closed account, etc.) may also be indicated to a user in some embodiments in connection with steps 512 and 524. The timestamps generated in connection with step 518 may also be provided to a user in connection with step 524 in order to provide the user with an indication as to when the contact's email address became undeliverable.

A status of whether an email address is deliverable or undeliverable may serve as an input that is fed back to a suggestion model or architecture for purposes of generating confidence scores, suggestions, actions based on the suggestions, and/or updating address books. For example, if an email is sent via a service provider and the email is returned as undeliverable, the service provider may obtain knowledge that the intended recipient's email address is invalid. That knowledge may be used to update address books of users that are registered with the service provider that include that undeliverable recipient email address. Similar techniques may be applied to phone calls where a telephone number (or other entries in an address book) is deemed to be inoperative or out-of-service or other types of contact information.

In terms of maintaining contact information within an address book, a determination as to whether to enter the contact information into the address book may be made upon receipt of the contact information in some embodiments. Determining whether to enter the contact information upon receipt may help to ensure that incorrect data is not added to an address book or related database, and that correct data is added to the address book or related database.

Figure 6:
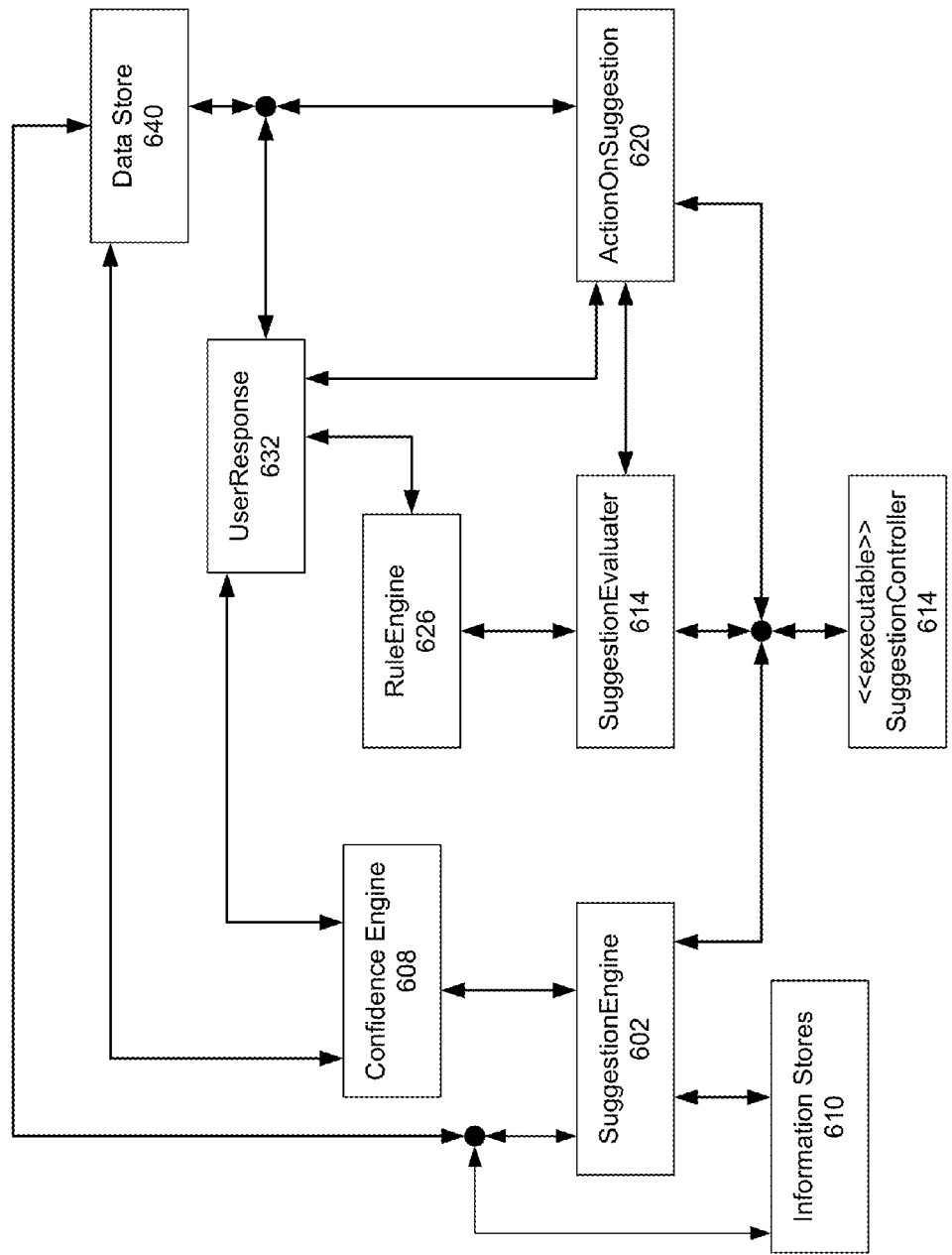
FIG. 6 illustrates an example architecture for providing suggestions and actions based on the suggestions in accordance with one or more aspects of this disclosure.

FIG. 6 illustrates a diagram, which may be a Unified Modeling Language (UML) diagram, that may be used in determining whether to incorporate contact information into an address book or related database. One skilled in the art would appreciate that the UML diagram could be implemented as computer-executable software processes, modules, or instructions, and that the software may be arranged or configured using one or more programming languages (e.g., assembly, C, C++, Java, etc.) at any level of abstraction. Alternatively, or additionally, the diagram of FIG. 6 could be implemented as any combination of hardware, software, and firmware. The components/entities of FIG. 6 will be described below in connection with the method of FIG. 7.

Figure 7:
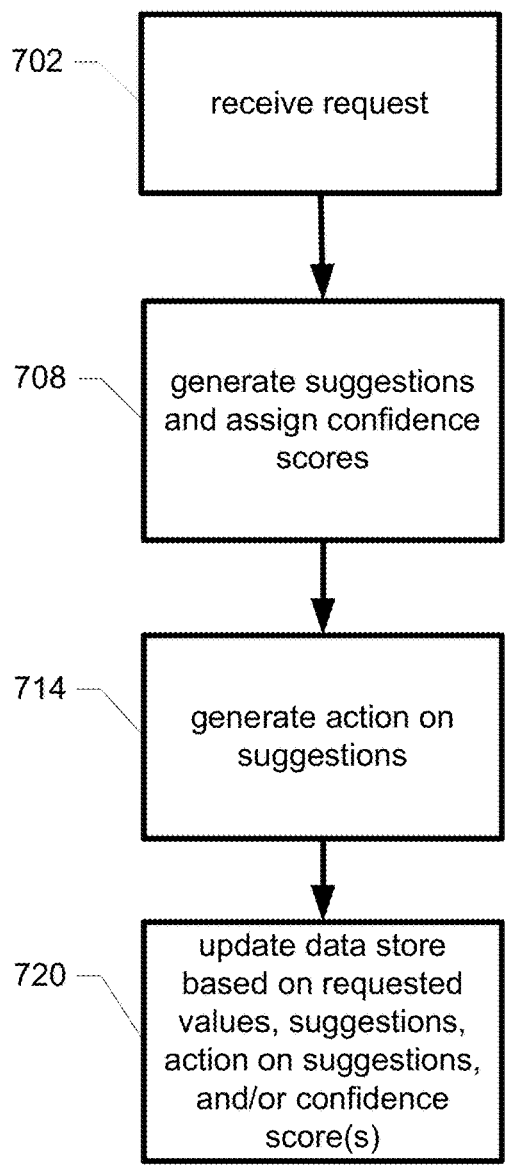
FIG. 7 illustrates a method suitable for providing suggestions and actions based on the suggestions in accordance with one or more aspects of this disclosure.

FIG. 7 illustrates a method that may be used to determine whether to incorporate received contact information (or an alternative suggestion, such as contact information included in composite view 368 of FIG. 3C for example) into an address book or related database. The execution of the method of FIG. 7 may be controlled by a suggestion controller 600 of FIG. 6, which may serve to coordinate the execution and functionality of the other components/entities shown in FIG. 6. For example, controller 600 may issue calls, commands, or directives or otherwise communicate with the other components/entities shown in FIG. 6.

Referring to FIG. 7, in step 702, suggestion engine 602 may receive a request in relation to contact information. The request may relate to one or more of an addition of a contact (such as the addition of a new contact), an addition of a contact entry related to or associated with an existing contact, a deletion of a contact or contact entry, or a modification or update to an existing contact entry. The request may also include the requested values (e.g., information and/or data). For example, and briefly referring to FIG. 3A, a request to add a contact may be accompanied by one or more of the values associated with the fields shown in entry 304.

The request of step 702 may be received at one or more devices, such as a server located at a central location (e.g., central location 103 of FIG. 1). The request may be received from one or more devices, such as a user equipment device (e.g., computing device 200 of FIG. 2). In some embodiments, the receipt of a request may be inferred at, e.g., a server based at least in part on one more events, such as receiving a message (e.g., an email) from the user equipment device to be delivered to one or more other devices.

In step 708, suggestion engine 602 may interact with confidence engine 608 (e.g., as shown in FIG. 6) to acquire confidence with respect to the requested values. In connection with the interaction of step 708, suggestions may be generated or obtained from information stores 610 (e.g., as shown via the line(s) coupling information stores 610 and suggestion engine 602 in FIG. 6) as alternatives to one or more of the requested values. Confidence engine 608 may, for example, execute one or more of the steps associated with the method of FIG. 4 described above to assign a confidence score to the requested values/fields and the generated suggestions. The confidence scores and/or the suggestions associated with step 708 may be generated at one or more devices, such as a server located at a central location (e.g., central location 103 of FIG. 1).

In step 714, one or more of the requested values and suggestions may be passed to suggestion evaluator 614 (not explicitly shown in FIG. 6). Suggestion evaluator 614 may interpret the requested values and suggestions and generate actions on suggestions or actions based on the suggestions 620, for example, based on one or more rules included in a rules engine 626 (e.g., as shown via the line coupling rules engine 626 and suggestion evaluator 614 in FIG. 6). In some embodiments, the actions based on the suggestions 620 may be generated at one or more devices, such as a server located at a central location (e.g., central location 103 of FIG. 1).

The rules included in rules engine 626 may be specified by one or more parties, such as a user, a service provider, a content provider, etc. The rules may specify default actions to take in response to a combination of requested values, suggestions and/or confidence scores generated by confidence engine 608. The rules may be stored or saved at one or more devices, such as a server located at a central location (e.g., central location 103 of FIG. 1). The rules may be used to generate actions on suggestions or action on suggestion objects in some embodiments. In some embodiments, a multi action on suggestion may be generated (optionally as part of a listing) that provides a plurality of actions to perform in connection with a suggestion as a set. In some embodiments, rules may be operative to perform other functions, such as standardizing a format for one or more content fields (e.g., a phone number) for example.

The actions based on the suggestions 620 may be operative to perform one or more tasks, and may be based on one or more inputs, such as user responses 632. As shown in FIG. 6, to facilitate user responses 632, a user or user equipment device (e.g., computing device 200) may be provided confidence scores (e.g., from confidence engine 608 as reflected via the line coupling confidence engine 608 to user responses 632, which may be incorporated in one or more devices such as a database or server) in connection with suggestions provided by actions based on the suggestions 620 (e.g., via the line coupling actions based on the suggestions 620, which may be a database or server, to user responses 632), and in accordance with rules provided by rules engine 626 (e.g., via the "use rules from" line coupling rules engine 626 to user responses 632).

The actions based on the suggestions may include: perform, ignore, ask-user, and notify. In some embodiments, the perform and ignore actions based on the suggestions may be configured to execute without any user input. For example, the perform action based on suggestion may incorporate one or more suggestions automatically without requesting input from a user, potentially replacing or modifying the requested values included with a request (e.g., request 702 of FIG. 7). Similarly the ignore action based on suggestion may ignore one or more suggestions without requesting input from a user, thereby incorporating the requested values without user input. The ask-user action based on suggestion may request an input to determine whether to adopt one or more suggestions. For example, a prompt may be provided on a display device requesting that a user indicate whether to incorporate the one or more suggestions. The user's response(s) to the ask-user action based on suggestions may serve to generate additional action based on suggestions. The user's response(s) to the ask-user action based on suggestions may be used to generate additional rules to be used in connection with rules engine 626. The notify action based on suggestion may be configured to provide a user with a notification that a suggestion has been incorporated or declined/ignored. Additional action based on suggestions may be included in some embodiments. The action based on suggestions may be provided to a user in any format, such as an email, a text message such as an SMS message, a voice message, etc.

In step 720, the requested values, suggestions (e.g., via the line coupling suggestion engine 602 to data store 640), actions based on the suggestions (e.g., via the line coupling action based on suggestions 620 and data store 640), and/or user responses (e.g., via the line coupling user responses 632 to data store 640) may be incorporated in data store 640 as contact information. Data store 640 may include one or more memories or databases in some embodiments. In some embodiments, data store 640 may include one or more user address books. Confidence values (generated by confidence engine 608) may also be included in, or saved to, data store 640 (e.g., via the line coupling confidence engine 608 to data store 640 shown in FIG. 6). Data and contact information stored in data store 640 may be used in connection with information stores 610 for purposes of generating suggestions. Thus, in some embodiments contact information included in data store 640 may be fed back to information stores 610 (not explicitly shown in FIG. 6), providing for an adaptive suggestion model. For example, scoring algorithms and scores may be updated and saved based on user response or user feedback. Moreover, while shown as discrete entities in FIG. 6, in some embodiments, information stores 610 and data stores 640 may be the same entity.

A user's response that incorporates a suggestion as contact information in data store 640 may result in the source of the suggestion receiving added weight in terms of generating future suggestions in connection with information stores 610. Conversely, if a user's response declines that same suggestion, the source of the suggestion may receive less (or negative) weight in terms of the future suggestions in connection with information stores 610.

Based at least in part on the foregoing description, contact information to be included in an address book may also be evaluated for accuracy and completeness at the time of entry, as well as at other points during use of an address book. The verified contact information may be used to define rules and suggestions for future requests with respect to the address book, improving the accuracy of the suggestion models over time.

De-duplication (also called de-duping) and merger of address book entries may be used to maintain contact information accuracy in an address book. De-duping may be used to delete and combine address book entries that refer to the same contact. De-duping may take place in connection with contact information stored on one or more devices, such as a server or database at a central location (e.g., central location 103 of FIG. 1). Alternatively, or additionally, de-duping may take place in connection with contact information stored at a user equipment device (e.g., computing device 200 of FIG. 2). De-duping may be used to minimize an amount or capacity of memory storage needed to store contact information by reducing or eliminating redundancy and inaccuracies in stored contact information.

In some embodiments, a central or common data store of all contact information that refers to a contact may be used to facilitate de-duping. One or more fields associated with the contact information may have an associated confidence (or probability or likelihood) score. The score(s) may be used to determine which contact information refers to the same contact. The score(s) may be used to determine which fields are likely to be correct. For example, such scores may be used to generate a composite view (e.g., composite view 368 of FIG. 3C) based on input contact information or data in a source view (e.g., source view 356 of FIG. 3B).

As an example, an address book may have two entries, such as entries #1 and #2 shown in FIG. 8. The first entry may have fields for name, email address, and home phone number. The values for the fields of the first entry may correspond to: name: Jane Smith, email address: jane@serviceprovider1.com, and home phone: 111-111-1111. The second entry may have fields for name, email address, mobile phone, and instant messenger handle. The values for the fields of the second entry may correspond to: name: Jane Wilson, email address: jane@serviceprovider2.com, mobile phone: 888-888-8888, and instant messenger handle: janewilson.

Continuing with the above example, confidence scores may be associated with the values of one or more of the fields in connection with the contact with a first name of "Jane." For example, the name Jane Smith associated with the first entry may have a low confidence score and the email address jane@serviceprovider1.com may have a low confidence score if, for example, an email sent to that address bounced. Conversely, the name Jane Wilson may have a high confidence score. Based on the confidence scores, a de-duplicate process may determine that the two address book entries refer to the same contact and could further determine what fields are likely to be correct.

Heuristics may be used to facilitate or supplement de-duping. For example, one or more contact fields (e.g., phone number, email address, social security number, instant messenger handle, etc.) may be examined or analyzed to determine the likelihood that two or more entries apply to the same contact. Once it is determined that two or more entries likely apply to the same contact (within a threshold amount), additional heuristics may be used to resolve potential conflicts. For example, if time stamps are associated with the entries, the latest information may be used. Similarly, if an identification of the sources is available, an algorithm may be operative to select the "more trusted" source (e.g., the source that has a higher associated confidence score, which may be based at least in part on whether suggestions originating from that source have historically been accepted).

Additional refinements may be made to the heuristics used. For example, external sources may be consulted to determine if contact information is available related to a particular contact at issue. If metadata associated with the contact information originating from, or stored in, the external sources indicates there is a high likelihood that a contact field in one of the entries to be merged is correct, then the contact field associated with that entry may be retained and data in conflicting fields may be discarded. Similarly, if the metadata associated with the contact information originating from, or stored in, the external sources indicates there is a high likelihood that a contact field in one of the entries to be merged is incorrect then that contact information may be removed from the candidate set of entries. Heuristics may be used to remove contact information from the candidate set of entries. The heuristics may include, for example, a name that differs significantly from a name in an (original) address book entry, a gender (derived from a name field) differing from a gender in the (original) address book entry, etc. The analysis may be repeated for a subset of (or all of) the fields associated with a contact.

Another refinement that may be used may include comparing two or more conflicting entries not only in terms of their current values, but also in terms of one or more previous values associated with the entries. For example, if a first entry for a contact named Bert Jones has BertJonesisbest2@serviceprovider.com as a current value for the email address field, and the email address value previously associated with that first entry was BertJones1@serviceprovider.com, and if a second entry has an email address of BertJones1@serviceprovider.com, then it may be inferred that the BertJonesisbest2@serviceprovider.com email address is more likely to be accurate, given that the email address associated with the first entry was changed from an email address corresponding to the second entry. In other words, in this illustrative example it may be assumed that the email address associated with the second entry is stale or out-of-date. More generally, the trajectory or the way in which contact information is updated or changed may be used to determine the likelihood that a selected piece of contact information is accurate or up-to-date.

Additional refinements and heuristics may be used in some embodiments.

As described above, in some embodiments, each piece of source data (collected from one or more sources, such as address books, databases of contact information, etc., and as shown in source view 356 of FIG. 3B) and/or a composite view of contact information (e.g., composite view 368 of FIG. 3C) that refers to a contact may be stored. The composite view may include a score of a likelihood or probability that a given piece of contact information is correct.

In some embodiments, metadata may also be stored in connection with a source view. The metadata may provide one or more indications of status related to the data. For example, the status of the data may reflect additions or changes to the data by a user, additions or changes to the data conducted by an automated process with user approval, additions or changes to the data by an automated process without user intervention, manual deletion of data by a user, deletion of data by an automated process with approval by a user, deletion of data by an automated process without user invention, etc. In some embodiments, the metadata may relate to a time stamp associated with one or more of an addition, a deletion, or a modification of the data. In some embodiments, the metadata may relate to privacy considerations associated with the data. In some embodiments, the metadata may relate to an identification of the source of the data. For example, sources of the data may include an address book, a user profile, one or more external sources, etc.

As described above, a composite view of data referring to a contact may be stored. The composite view may include one or more pieces (and in some embodiments, all pieces) of contact information referring to a contact. Along with the contact information, the likelihood or probability of the piece of contact information being correct (e.g., as reflected in a confidence score) may be stored. The likelihood or probability may be calculated based at least in part on the metadata stored in connection with the metadata described above. In some embodiments, the calculation may be updated when the data changes (e.g., due to an addition of data, a deletion of data, or a modification of data) or in response to heuristics or other determinations impacting the relative weight of one piece of data relative to one or more other pieces of data.

In some embodiments, multiple users may store contact information referring to the same contact using various classifications. For example, a first user may indicate that a phone number associated with a contact is a home phone number, and a second user may indicate that same phone number associated with that contact as a work phone number. Similarly, different collections of contact information may have different sets of fields. Continuing with the above example, the first user's address book or application might only support a single phone number field, while the second user's address book or application might support multiple phone number fields.

Continuing with the above example, in some embodiments, in a composite view the phone number associated with the contact might be stored only once, despite the fact that it may appear in different fields of one or more address books or other collections of contact information. Metadata associated with a piece of data may include a confidence score of that piece of contact data actually being associated with a given field or subtype. Thus, in relation to the above example of the first user associating a contact phone number with the contact's home, and a second user associating that same contact phone number with the contact's place of work, a confidence score may be associated with the probability that the contact's phone number is actually a home phone number. Similarly, a confidence score may be associated with the probability that that the contact's phone number is actually a work phone number.

In some embodiments, some or all address book entries of a similar type (e.g. phone numbers) may be collapsed into a single field. In some embodiments, along with contact data (e.g. foo@acme.com) metadata about the sub field type(s) (e.g. home phone number, work phone number, mobile phone number) may be stored.

In some embodiments, a single piece of contact data (e.g., an email address, such as foo@acme.com) may only be stored in a single field even if it appears in multiple field types (e.g., home email, work email) in the source data (e.g., different address books, other collections of contact information, etc.).

In some embodiments, when a composite view (e.g., composite view 368 of FIG. 3C) of contact information about an individual is stored, a single piece of contact data may only be stored in a single field. Metadata associated with the piece of data may include a likelihood of that piece of contact data being a given subtype (e.g. mobile phone number, home phone number, work phone number, etc.).

In some embodiments, incomplete or inaccurate contact information may make its way into one or more address books. For example, and as the name implies, confidence scores might only have an associated degree of precision or correctness associated with them. Moreover, when the methods and systems described herein are first being implemented or launched, the algorithms might not have the wisdom of the crowds data available to them, and thus, might not have the ability to fine-tune confidence scores or suggestions. Additionally, even when the algorithms and systems may be operating as intended (e.g., a suggestion or action based on the suggestion is provided to a user to correct for an error in a requested value associated with a change request), one or more users may simply elect to override or ignore the (action based on) suggestion(s) provided by the system.

In this regard, in some embodiments after a significant or threshold number of users have responded to contact information change suggestions, a statistical model (such as a binary logistic regression) may be run or executed to determine which factors are most or least likely to predict that a suggestion will be accepted. Thus, the algorithms and methods used to provide suggestions may be refined based on the output of the statistical model. The refinements may be used to reduce the likelihood of incorrect or incomplete contact information included in (other users) address books or included in external data sources from being presented to a user as a suggestion. In this manner, the accuracy of suggestions provided to a user requesting a change to an address book may be enhanced while still allowing users the ability to customize and tailor address book entries to their particular tastes or styles. In other words, a particular user's idiosyncratic tastes or tendencies may still be used in connection with that user's address book if so desired, but that user's tastes or tendencies might be excluded as an input in formulating a suggestion for contact information for other users.

While the methods and architectures described above related to email addresses and emails for purposes of maintaining an address book illustration, the methods and architectures may be adapted to accommodate any other form of communication (e.g., phone calls, instant messages, etc.) in any number of applications (e.g., calendars, photo albums, etc.).

Aspects of this disclosure may readily be applied to, and adapted to be operative on, one or more communication systems. Those communication systems may include computer networks, television networks, satellite networks, telephone and cellular networks, and the like.

Although not required, various aspects described herein may be embodied as a method, a data processing system, and/or as a transitory and/or non-transitory computer-readable medium storing executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more networks. Moreover, the structural components described herein may be distributed amongst one or more devices, optionally within a common housing or casing.

Various signals representing content, data, or events as described herein may be transferred between a source and a destination in the form of electromagnetic waves traveling through signal-conducting media such as metal wires, optical fibers, and/or wireless transmission media (e.g., air and/or space).

The various methods and acts may be operative across one or more computing servers and one or more networks. The functionality may be distributed in any manner, or may be located in a single computing device (e.g., a server, a client computer, etc.). As discussed herein, content may be distributed to intermediary/network components and client-side devices at various times and in various formats. The distribution and transmission techniques described herein may leverage existing components and infrastructure to minimize power dissipation, operational complexity, footprint size, and management involvement, amongst other factors and costs.

The methodological acts and processes may be tied to particular machines or apparatuses. For example, as described herein, address books may be maintained via one or more computing devices (e.g., servers) and contact information associated therewith may be displayed at a user location via one or more display devices. The contact information referenced by an address book may be formatted in accordance with one or more transmission techniques, types, or protocols. More generally, one or more computers may include one or more processors and memory storing instructions, that when executed, perform the methodological acts and processes described herein. Furthermore, the methodological acts and processes described herein may perform a variety of functions including transforming an article (e.g., contact information associated with an address book) into a different state or thing (e.g., personalized contact information having an associated level or degree of confidence).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above in any order. It will also be appreciated and understood that modifications may be made without departing from the true spirit and scope of the present disclosure. The description is thus to be regarded as illustrative instead of restrictive on the present disclosure.

What is claimed is:

1. A method comprising:
obtaining, by a computing device and from a first source, trajectory data associated with first contact information and with a previous version of the first contact information;
obtaining, by the computing device and from a second source, second contact information;
generating, based at least in part on a comparison of the trajectory data and the second contact information, a first confidence score for the first contact information;
generating, based at least in part on metadata associated with the second contact information, a second confidence score for the second contact information;
selecting, based at least in part on application of a rule that determines the first confidence score indicates more confidence than the second confidence score, the first contact information; and
storing, in a contact data store, the first contact information.

2. The method of claim 1,
wherein the obtaining the trajectory data from the first source comprises obtaining the first contact information from a first address book associated with a first user, and
wherein the storing the first contact information comprises incorporating the first contact information into a second address book associated with a second user different from the first user.

3. The method of claim 1, further comprising receiving a request for data associated with a person, wherein the obtaining the trajectory data is responsive to the receiving the request for the data.

4. The method of claim 1, further comprising:
comparing the first confidence score with the second confidence score; and
suggesting the first contact information based at least in part on the comparing.

5. The method of claim 1, further comprising:
suggesting, based at least in part on the first confidence score, the first contact information to a user requesting the first contact information; and
receiving a response to the suggesting,
wherein the storing is further based on the response.

6. The method of claim 1, further comprising:
determining, based on the comparison of the trajectory data and the second contact information, that the previous version of the first contact information matches the second contact information,
wherein the generating the first confidence score indicating more confidence than the second confidence score is based at least in part on the determining.

7. The method of claim 1, wherein the obtaining the trajectory data comprises obtaining the first contact information in a first field of a plurality of fields each comprising different information associated with a particular person.

8. The method of claim 1, wherein the first contact information comprises at least one of a name, an email address, a mailing address, a phone number, or an instant messenger handle.

9. The method of claim 1, further comprising:
prioritizing the first source relative to the second source in response to the storing the first contact information.

10. The method of claim 1,
wherein the generating the first confidence score is further based on at least one of an identification of the first source, a timestamp associated with the first contact information, an identification of an origin of the first contact information, or an indication of whether the first source is a public source or a private source, and
wherein the metadata comprises at least one of second trajectory data associated with the second contact information, a timestamp associated with the second contact information, an identification of the second source, an identification of an origin of the second contact information, or an indication of whether the second source is a private source or public source.

11. The method of claim 1, wherein the generating the first confidence score is further based on a number of sources comprising the first contact information.

12. The method of claim 1, wherein the generating the first confidence score comprises applying another rule that assigns a higher confidence score to the first contact information if the trajectory data indicates that the second contact information was changed to the first contact information than if the trajectory data indicates that the first contact information was changed to the second contact information.

13. A method comprising:
obtaining, by a computing device and from a first source, first contact information and second contact information, wherein the second contact information represents an earlier version of the first contact information;
obtaining, by the computing device and from a second source, third contact information;
generating, based at least in part on a determination that the second contact information matches the third contact information, a first confidence score for the first contact information;
generating, based at least in part on metadata associated with the third contact information, a second confidence score for the third contact information;
incorporating, based at least in part on an evaluation that the first confidence score indicates more confidence than the second confidence score, the first contact information into a contact data store; and
based on the incorporating the first contact information into the contact data store, prioritizing the first source for generating a future suggestion.

14. The method of claim 13,
wherein the generating the first confidence score is further based on metadata associated with the first contact information, the metadata associated with the first contact information comprising at least one of an identification of the first source, a timestamp associated with the first contact information, an identification of an origin of the first contact information, or an indication of whether the first source is a private source or public source, and
wherein the metadata associated with the third contact information comprises trajectory data associated with the third contact information, a timestamp associated with the third contact information, an identification of the second source, an identification of an origin of the third contact information, or an indication of whether the second source is a private source or public source.

15. The method of claim 13, further comprising providing a suggestion comprising the first contact information in response to a determination that the first confidence score satisfies a threshold or indicates more confidence than another confidence score.

16. The method of claim 13, further comprising:
providing, based at least on the first confidence score, a suggestion that suggests the first contact information, wherein the incorporating comprises incorporating, in response to approval of the suggestion, the first contact information into the contact data store.

17. The method of claim 13, wherein the prioritizing comprises increasing a priority level of the first source relative to other sources that provide contact information.

18. The method of claim 13,
wherein the generating the first confidence score for the first contact information is based at least in part on a priority level of the first source,
wherein the priority level is based at least in part on acceptance or rejection of a past suggestion of other contact information of the first source, and
wherein the prioritizing the first source for generating the future suggestion comprises updating the priority level of the first source.

19. A method comprising:
obtaining, by a computing device and from a first source, first contact information and first trajectory data indicating that the first contact information replaced previous contact information;
obtaining, by the computing device and from a second source, second contact information;
generating, based at least in part on a determination that the previous contact information matches the second contact information, a first confidence score for the first contact information;
generating, based at least in part on metadata associated with the second contact information, a second confidence score for the second contact information; and
updating a priority level of the first source in response to a determination to incorporate, based on the first confidence score and the second confidence score indicating that the first contact information is more likely to be accurate than the second contact information, the first contact information into a contact data store.

20. The method of claim 19, further comprising incorporating the first contact information into the contact data store based at least in part on the first confidence score.

21. The method of claim 19, further comprising:
in response to a determination that the first confidence score satisfies a threshold or is greater than the second confidence score, providing a suggestion to incorporate the first contact information; and
in response to acceptance of the suggestion, determining to incorporate the first contact information into the contact data store.

22. The method of claim 19, further comprising:
determining, based at least on a privacy consideration associated with the first contact information, whether to suggest the first contact information to a first user, wherein the first contact information comprises contact information for contacting a second user.

* * * * *